United States Patent [19]

Naudet

[11] Patent Number: 5,579,644

[45] Date of Patent: Dec. 3, 1996

[54] TURBO-JET EQUIPPED WITH INCLINED BALANCING DISKS WITHIN THE ROTOR OF THE HIGH PRESSURE COMPRESSOR AND PROCESS FOR PRODUCING SUCH DISKS

[75] Inventor: Jacky S. Naudet, Bondoufle, France

[73] Assignee: Societe Nationale d'Etude et de Construction de Moteurs d'Aviation "Snecma", Paris, France

[21] Appl. No.: 314,285

[22] Filed: Sep. 30, 1994

[30] Foreign Application Priority Data

Oct. 13, 1993 [FR] France .................................. 93 12162

[51] Int. Cl.$^6$ ...................................................... F02C 1/00
[52] U.S. Cl. .............................. 60/726; 60/39.75; 60/269
[58] Field of Search ............................. 60/268, 269, 726, 60/39.75; 416/198 A, 201 R

[56] References Cited

U.S. PATENT DOCUMENTS

| | | | |
|---|---|---|---|
| 2,497,151 | 2/1950 | Clark et al. ................................ | 416/201 |
| 2,548,886 | 4/1951 | Howard ..................................... | 60/726 |
| 2,869,820 | 1/1959 | Merchant et al. ........................ | 416/201 |
| 2,922,618 | 1/1960 | Paulson . | |
| 4,127,988 | 12/1978 | Becker ...................................... | 60/726 |
| 4,743,165 | 5/1988 | Ulrich . | |
| 5,213,475 | 5/1993 | Peterson et al. . | |

FOREIGN PATENT DOCUMENTS 0193701   11/1982   Japan ................................. 416/198 A Primary Examiner—Timothy S. Thorpe
Assistant Examiner—Ted Kim
Attorney, Agent, or Firm—Oblon, Spivak, McClelland, Maier & Neustadt, P.C.

[57] ABSTRACT

A method and apparatus for maintaining or holding the rotor of a high pressure compressor of a very rigid turbojet during turbojet operation. The interior of the rotor of the high pressure compressor comprises upstream-inclined balancing disks (13) which are free of fly-weights. The centrifugal force applied to such balancing disks creates a load or stress on the disks having a radial component rending to compensate for the stresses towards the outside due to the blades, in front of which are positioned the balancing disks. The process for the production of such an exhaust cone is made easier, particularly with respect to the blank to be supplied for obtaining such a part.

3 Claims, 4 Drawing Sheets

TURBO-JET EQUIPPED WITH INCLINED BALANCING DISKS WITHIN THE ROTOR OF THE HIGH PRESSURE COMPRESSOR AND PROCESS FOR PRODUCING SUCH DISKS

BACKGROUND OF THE INVENTION

1. Field of the Invention

The invention relates to turbojets, whose high pressure compressor is equipped with stiffening disks on the inner face of its rotor. The function of such disks is to compensate for the radial stresses supplied by the blades or blade assemblies of the rotor fixed to the outer face of the latter.

2. Prior Art and Set Problem

With reference to FIG. 1, the rotor 2 of a high pressure compressor 1 of a turbojet has blades 4, whose function, in conjunction with the blades 5 of the stator 6, is to compress the air flow within the reactor before supplying it to a combustion chamber 7. This rotor 2 also has a downstream exhaust cone 8 narrowing with respect to the axis 10 of the rotor 2.

With reference to FIG. 2, a prior art exhaust cone 8 essentially comprises a first conventional disk 9, perpendicular to the rotor axis 10 and having at its end a fly-weight 9A. In the same way, in the center of the conical portion 11 of said cone 8, there is a second conventional disk 12, which is surmounted by a fly-weight 12A. In general terms, said second conventional disk 12 is less wide than the first conventional disk 9.

These conventional stiffening disks 9 and 12 serve to prevent rotor deformation, i.e. a deformation of its upstream ferrule 13 and of the conical outlet portion 11. Thus, under the effect of the centrifugal force, the rotor blades tend to be drawn towards the exterior thereof. The conventional disks 9 and 12 make it possible to balance said force by creating an internal inertia, more particularly due to their respective fly-weights 9A,12A. Thus, the latter are placed on radii which are much smaller than the rotational axis of the rotor 10 compared with the root of the blades on the ferrule. This compensation phenomenon is symbolized by vertical arrows in opposite directions designated F.

The disadvantage of these conventional disks 9 and 12 is that they have a relatively high weight, mainly due to their fly-weights 9A,12A. In addition, in FIG. 2, it is possible to see in mixed line form the displacement of the exhaust cone during the operation of the engine. Thus, it undergoes both a widening and an elongation in the downstream direction.

The object of the invention is to attempt to reduce the weight of the rotor, while preventing deformations due to the blade assemblies.

SUMMARY OF THE INVENTION

To this end, a first main object of the invention is a turbojet also having a high pressure compressor rotor, which itself incorporates a ferrule and an exhaust cone equipped with balancing disks within the rotor, in order to compensate for the centrifugal forces applied by the blade systems of the rotor to the latter.

According to the invention, certain balancing disks are conical with respect to the rotation axis of the rotor and do not have fly-weights.

Preferably, in the exhaust cone, the balancing disk is inclined upstream of the turbojet. In this case, there is also a non-conical disk with a fly-weight placed in the upstream portion of the exhaust cone.

A second main object of the invention is a process for the production of an exhaust cone of a high pressure compressor of a turbojet, comprising the following steps:

molding to obtain casting blanks constituting ferrule sections and an exhaust cone, as described hereinbefore, the casting of the exhaust cone having a shape including the final exhaust cone without having recesses with respect to the envelope of said exhaust cone, butt welding by friction the different sections and machining the final shapes of the rotor.

Preferably, the exhaust cone is made from a L18 nickel-based alloy.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DESCRIPTION OF THE PREFERRED EMBODIMENT

Figure 3:
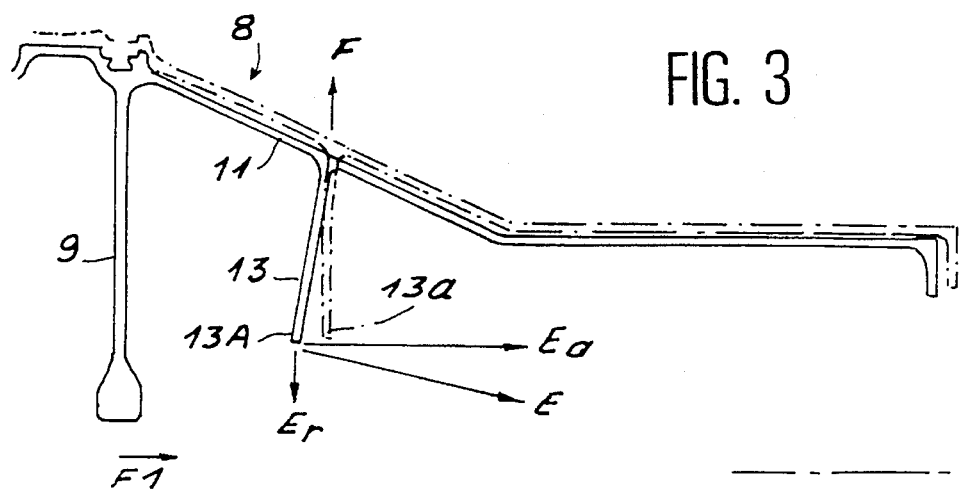
FIG. 3 illustrates, in section, an exhaust cone of a high pressure compressor of a turbojet according to the invention.

With reference to FIG. 3, the exhaust cone according to the invention is shown with a conventional disk 9 placed at its inlet. However, said exhaust cone 8 has on its conical portion 11 a balancing disk 13 inclined with respect to a vertical plane (i.e. a plane orthogonal to the rotation axis 10 of the rotor, as shown in FIG. 3). The inclination direction is such that the disk 13 tends to be more perpendicular to the inner wall of the conical portion 11 of the exhaust cone 8. In other words, its radially inner end 13A is oriented upstream with respect to the flow direction and is movable in the upstream direction upon rotation of the rotor.

As is indicated by the horizontal arrow $F_1$ oriented from left to right, when rotor rotates at high speed, the free end 13A of the inclined disk 13 tends to approach the rotation axis 10 of the rotor, i.e. pass downstream. As a result of the inclination of said inclined disk 13 and the conicity of the central portion 11, the stress or load E applied to the end 13A of the inclined disk 13 has an axial component $E_a$ and a radial component $E_r$. This radial component $E_r$ compensates the stress F facing the base of the inclined disk 13. FIG. 3 also shows in mixed line form the position of the exhaust cone 8 during turbojet operation.

Figure 4:
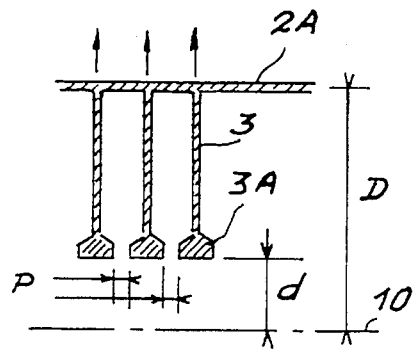
FIG. 4 shows, in section, conventional balancing disks used in the prior art turbojets.

Referring to FIG. 4, a portion of the ferrule of a high pressure compressor of a prior art turbojet is shown with three conventional balancing disks, i.e. of the fly-weight type. These balancing disks 3 are perpendicular to the rotor ferrule 2A. Their respective weights 3A are at a distance d from the turbojet axis 10. This distance d is relatively small in view of the width of the disks 3. The intervals p illustrate the relatively small spaces separating the fly-weights 3A from one another. Thus, it is by no means easy to introduce maintenance or repair machines or devices between the prior art balancing disks 3.

Figure 5:
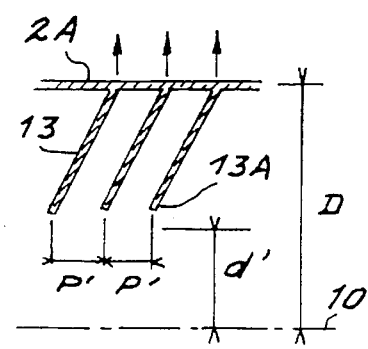
FIG. 5 illustrates, in section, balancing disks according to the invention.

With reference to FIG. 5, the same type of section is provided for a portion of the ferrule of a high pressure compressor of a turbojet according to the invention. It can be seen that the balancing disks 13 are inclined with respect to a plane perpendicular to the axis 10 of the turbojet and to ferrule portion 2A. Moreover, as their width is smaller than that of the prior art disks, the distance d' separating their end 13A from the turbojet axis 10 is larger. As shown in FIG. 5, the width of the balancing disk 13 is substantially uniform in a radial direction of the female portion 24. It can also be seen that the spacing p' separating each balancing disk 13 is larger than the space p in FIG. 4. This has the advantage of permitting the introduction of maintenance and repair devices between said balancing disks 13. It should be noted that the balancing disks 13 are, according to the invention, always inclined upstream with respect to the air flow in the turbojet.

Figure 1:
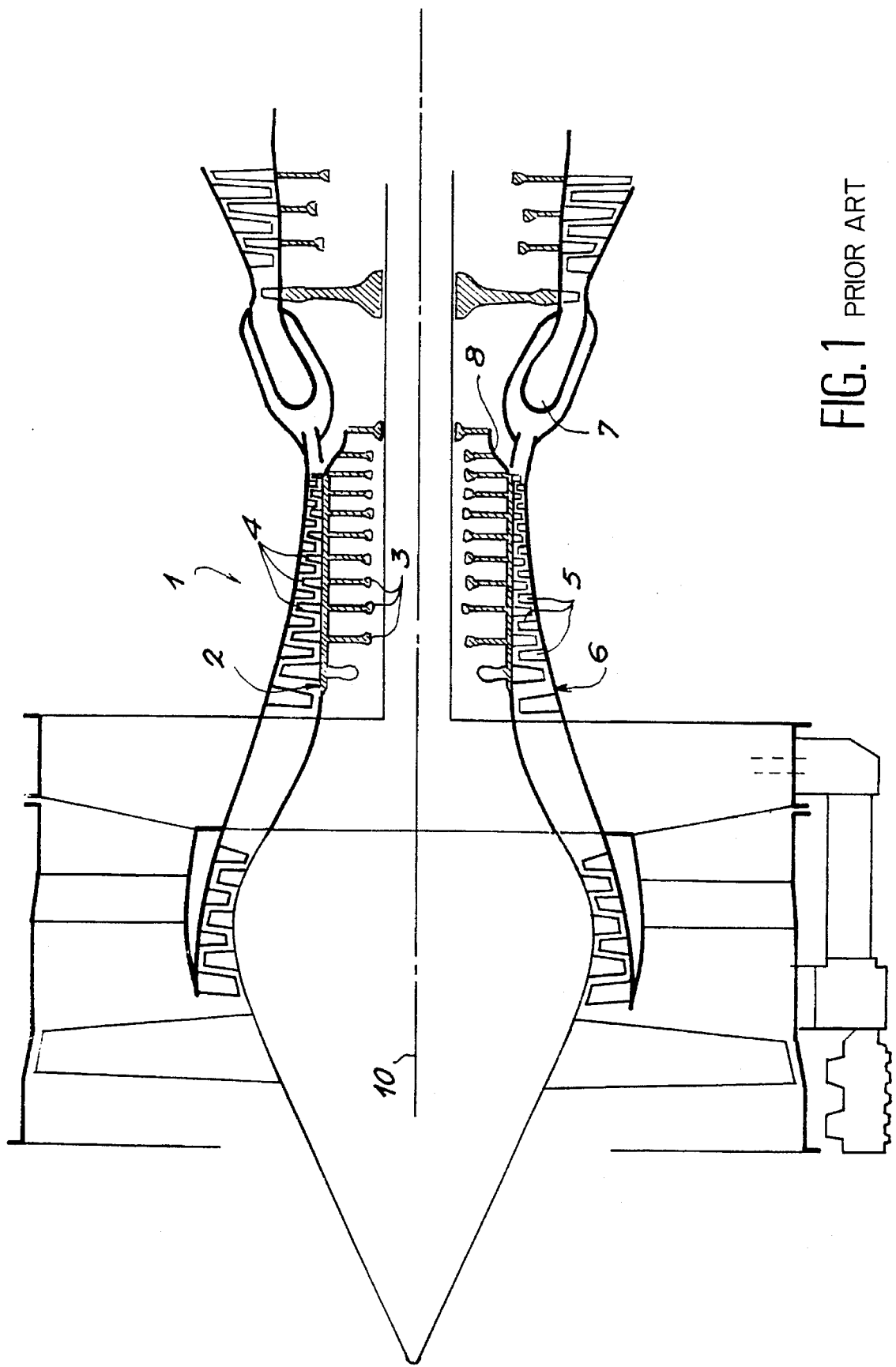
FIG. 1 shows in section, a prior art turbojet which can be transformed according to the present invention.
Figure 2:
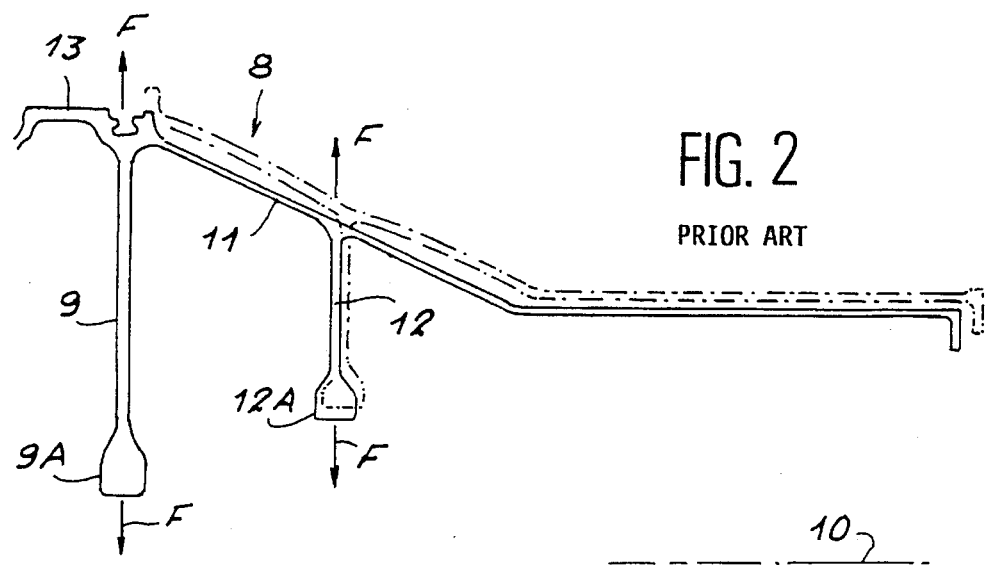
FIG. 2, in section, an exhaust cone of a high pressure compressor of a prior art turbojet.
Figure 6:
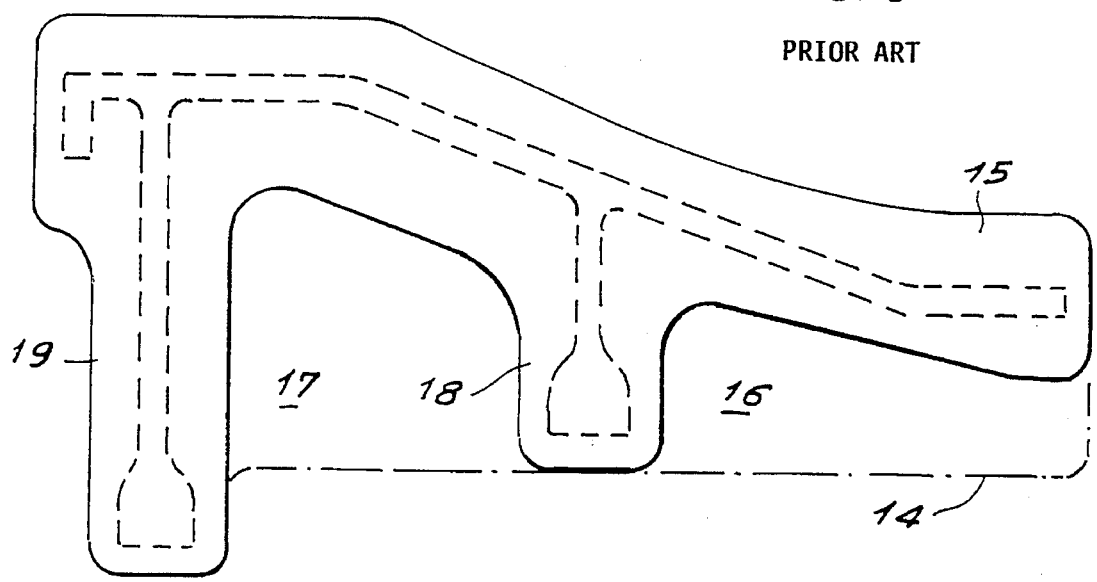
FIGS. 6 and 7 shows the deformation of a prior art exhaust cone blank.

FIG. 6 shows a blank or a casting for forming an exhaust cone 8 in FIG. 2. It can also be seen that the left-hand portion 19 including the future balancing disk 9 of FIG. 2 is relatively wide, i.e. said branch occupies a considerable amount of space, particularly in the direction of the turbojet axis 10. The central pin 18 including the future balancing disk 12 of FIG. 2 is smaller and only takes up a moderate amount of space. Thus, cavities 17 and 16 are provided both between these two branches 18,19 and between the central branch 18 and the left-hand end 15 of said blank.

Figure 7:
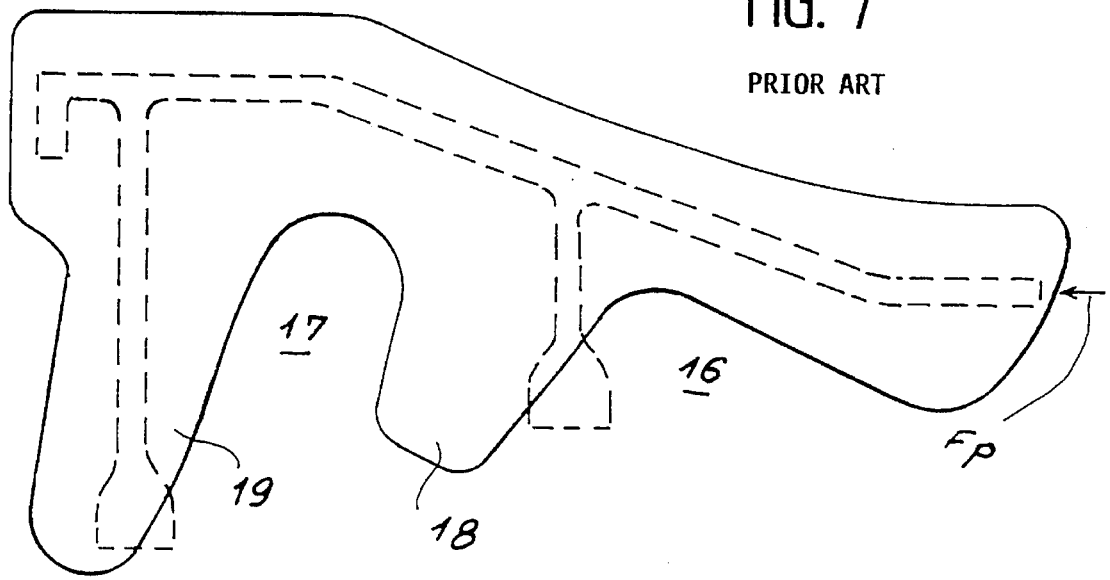

With reference to FIG. 7, in order to carry out friction welding on the upstream portion of the ferrule of said exhaust cone, it is necessary to exert a very significant pressure force $F_p$ downstream of said part, as is illustrated by the arrow to the right of FIG. 7. If the blank or casting has a configuration with recesses, such as 16 and 17, said significant force $F_p$ would involve an accordion-type folding up of said part, as is illustrated by the latter in FIG. 7. Thus, in this case said blank must have a configuration like that shown in mixed line form in FIG. 6, where it is given the reference numeral 14. Therefore, in other words, the recesses 16,17 must be filled. This leads to a very significant weight and volume of the blank and to subsequent machining operations. Therefore the cost of the finished part is much higher.

Figure 8:
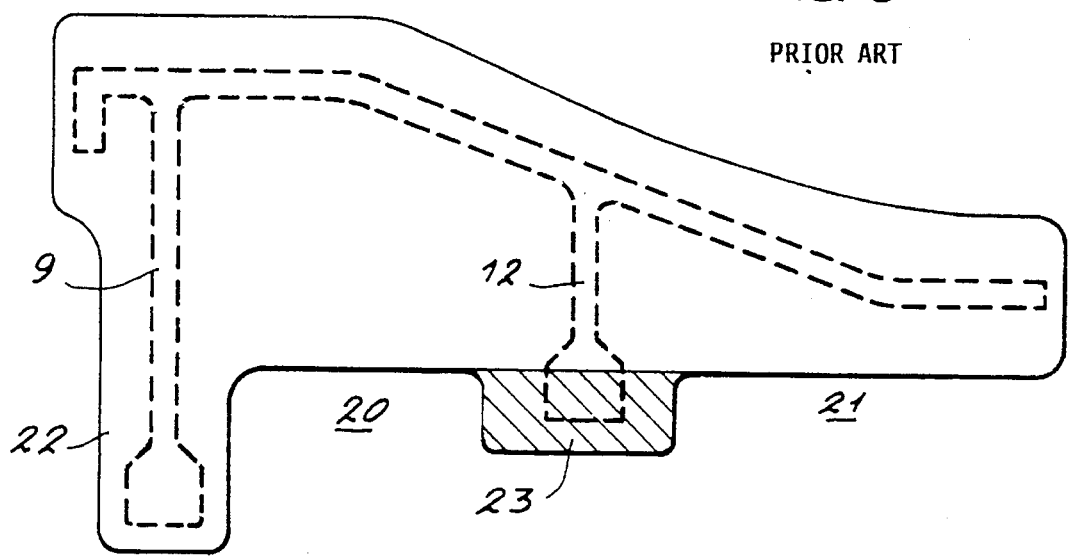
FIG. 8 illustrates, in section, another prior art exhaust cone blank.

With reference to FIG. 8, if it is wished to limit the weight of the blank, it is necessary to add a central portion 23 at the level of the future balancing disk 12 and to make relatively small recesses 20,21 therein.

Figure 9:
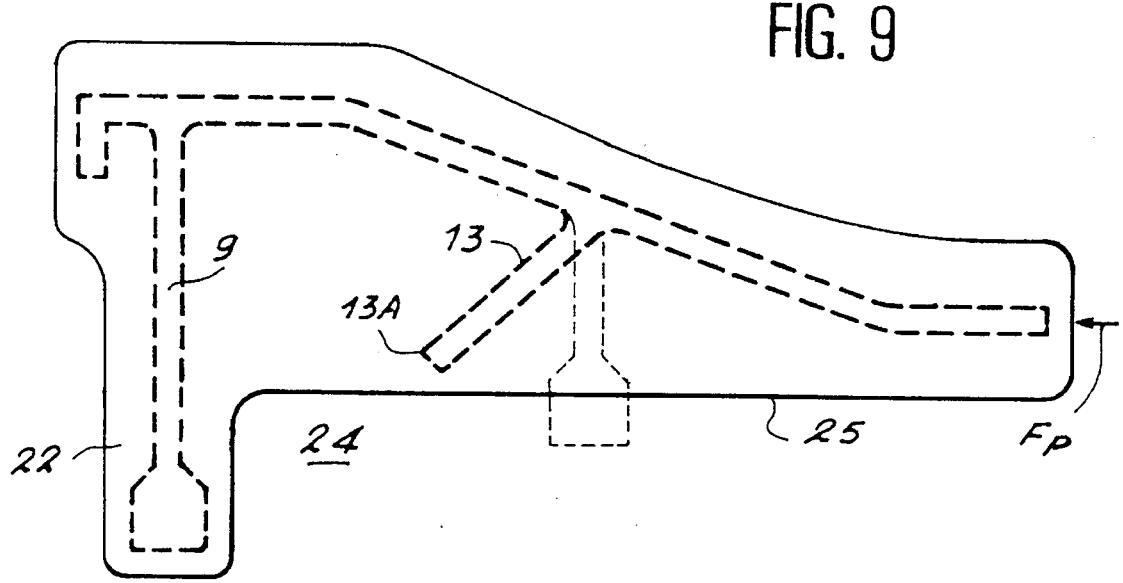
FIG. 9 shows, in section, a blank of an exhaust cone according to the invention.

With reference to FIG. 9, if the conventional balancing disk 12 is replaced by a balancing disk according to the invention 13, the blank or casting can have a volume corresponding to that of the part 8, without the central boss 23. Therefore a high load $F_p$ can be applied downstream in order to carry out friction welding of the said exhaust cone to the ferrule of the high pressure compressor. Therefore the cost of the part is reduced compared with that of a part based on the conventional balancing disks 12 and 9 of FIG. 2.

The process for the production of an exhaust cone, like that described hereinbefore, for a high pressure compressor of a turbo-jet consequently successively consists of performing the following operations:

1. A blank is firstly molded in order to obtain a casting, whose outer shape includes the final exhaust cone without a recess, except for a recess 24 in FIG. 9, and which is located between the left-hand portion 22 of the part including the conventional disk 9 and the material including the balancing disk 13 according to the invention. In other words, the surface 25 within said exhaust cone is cylindrical and has a diameter slightly smaller than that defined by the end 13A of the central balancing cone 13.

2. This is followed by a friction welding of said blank to the remainder of the ferrule constituting the central section of the high pressure compressor of the turbojet.

3. Machining of the assembly makes it possible to obtain the final internal and external shapes of the complete rotor.

It is pointed out that the preferred construction of the exhaust cone consists of using a N18 nickel-based superalloy and employing the powder metallurgy process (NdP).

The use of such oblique balancing disks consequently ensures better axial accessibility to the space within the ferrule of the high pressure compressor. The castings or blanks used are less expensive to make and a non-negligible weight gain is obtained.

Obviously, numerous modifications and variations of the present invention are possible in light of the above teachings. It is therefore to be understood that within the scope of the appended claims, the invention may be practiced otherwise than as specifically described herein.

I claim:

1. A turbojet, which comprises: a high pressure compressor rotor, through which a gas passes from an upstream portion to a downstream portion of the turbojet, which has a ferrule and an exhaust cone equipped with blade assemblies and disks within the rotor compensating for centrifugal forces applied by the blade assemblies to the body of the rotor, wherein at least one of the compensating disks is conical with respect to a rotational axis of the rotor, is free of any fly-weights fixed thereto and is of a substantially uniform thickness in a radial direction of the ferrule such that upon rotation of the rotor, the at least one conical disk has a radial inner end which is subjected to displacement towards a downstream portion of the turbojet and a radial outer end attached to said exhaust cone.

2. A turbojet according to claim 1, wherein in the exhaust cone of the rotor, the at least one compensating disk is inclined in the upstream portion of the turbojet with respect to a plane orthogonal to the rotational axis of the rotor.

3. A turbojet according to claim 2, which comprises a disk having a fly-weight located in an upstream portion of the exhaust cone.

* * * * *

UNITED STATES PATENT AND TRADEMARK OFFICE
CERTIFICATE OF CORRECTION

PATENT NO. : 5,579,644
DATED      : December 3, 1996
INVENTOR(S) : Jacky S. NAUDET It is certified that error appears in the above-indentified patent and that said Letters Patent is hereby corrected as shown below:

On the title page, item [54] and column 1, line 1, "TURBO-JET" should be --TURBOJET--.

Signed and Sealed this

Fifteenth Day of April, 1997

*Attest:*

BRUCE LEHMAN

*Attesting Officer*     *Commissioner of Patents and Trademarks*